(12) United States Patent
Li et al.

(10) Patent No.: US 10,647,909 B2
(45) Date of Patent: May 12, 2020

(54) HYDRAULIC FRACTURING FLUID

(71) Applicant: SAUDI ARABIAN OIL COMPANY, Dhahran (SA)

(72) Inventors: Leiming Li, Sugar Land, TX (US); Feng Liang, Cypress, TX (US); Ghaithan A. Al-Muntasheri, Houston, TX (US); Amy J. Cairns, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 158 days.

(21) Appl. No.: 14/994,958

(22) Filed: Jan. 13, 2016

(65) Prior Publication Data

US 2017/0198207 A1 Jul. 13, 2017

(51) Int. Cl.
*C09K 8/68* (2006.01)
*C09K 8/90* (2006.01)
(Continued)

(52) U.S. Cl.
CPC .............. *C09K 8/685* (2013.01); *C09K 8/665* (2013.01); *C09K 8/887* (2013.01); *C09K 8/90* (2013.01); *C09K 2208/10* (2013.01)

(58) Field of Classification Search
None
See application file for complete search history.

(56) References Cited

U.S. PATENT DOCUMENTS 4,780,223 A 10/1988 Baranet et al.
6,227,295 B1 5/2001 Mitchell et al.
(Continued)

FOREIGN PATENT DOCUMENTS

CN 103387827 11/2013
WO 2012122505 9/2012
(Continued)

OTHER PUBLICATIONS

Li et al., "High-Temperature Fracturing Fluids Using Produced Water with Extremely High TDS and Hardness", IPTC-17797-MS,, Dec. 2014, 13 pages.
(Continued)

*Primary Examiner* — Jeffrey D Washville
(74) *Attorney, Agent, or Firm* — Fish & Richardson P.C.

(57) ABSTRACT

A fracturing fluid including a base fluid including salt water, a polymer, a crosslinker, and a nanomaterial. The crosslinker may include a Zr crosslinker, a Ti crosslinker, an Al crosslinker, a borate crosslinker, or a combination thereof. The nanomaterial may include $ZrO_2$ nanoparticles, $TiO_2$ nanoparticles, $CeO_2$ nanoparticles; Zr nanoparticles, Ti nanoparticles, Ce nanoparticles, metal-organic polyhedra including Zr, Ti, Ce, or a combination thereof; carbon nanotubes, carbon nanorods, nano graphene, nano graphene oxide; or any combination thereof. The viscosity and viscosity lifetime of fracturing fluids with both crosslinkers and nanomaterials are greater than the sum of the effects of crosslinkers and nanomaterials taken separately. Moreover, this synergistic effect offers significant, practical advantages, including the ability to use salt water rather than fresh water for fracturing fluids, the ability to reduce polymer loading to achieve a desired viscosity, and the ability to achieve better formation cleanup after the fracturing treatment.

15 Claims, 7 Drawing Sheets

(51) Int. Cl.
*C09K 8/88* (2006.01)
*C09K 8/66* (2006.01)

(56) References Cited

U.S. PATENT DOCUMENTS

| | | | |
|---|---|---|---|
| 8,003,577 B2 | 8/2011 | Li et al. | |
| 8,822,386 B2 | 9/2014 | Quintero et al. | |
| 8,835,363 B2 | 9/2014 | Amanullah et al. | |
| 9,006,151 B2 | 4/2015 | Amanullah et al. | |
| 2008/0234147 A1 | 9/2008 | Li et al. | |
| 2012/0267102 A1* | 10/2012 | Huang | C09K 8/032 166/279 |
| 2014/0096964 A1 | 4/2014 | Chakraborty et al. | |
| 2014/0364343 A1 | 12/2014 | Nelson et al. | |
| 2015/0057196 A1* | 2/2015 | Debord | C09K 8/685 507/213 |
| 2015/0065398 A1* | 3/2015 | Gartland | C09K 8/36 507/118 |
| 2015/0284625 A1 | 10/2015 | Silveira | |
| 2016/0130496 A1* | 5/2016 | Holtsclaw | C04B 24/32 507/226 |
| 2017/0015895 A1* | 1/2017 | Cox | C09K 8/03 |
| 2017/0198207 A1 | 7/2017 | Li et al. | |
| 2018/0155602 A1* | 6/2018 | Zhang | C09K 8/04 |

FOREIGN PATENT DOCUMENTS

| | | |
|---|---|---|
| WO | 2013052359 | 4/2013 |
| WO | WO2014008598 | 1/2014 |
| WO | WO2014123672 | 8/2014 |
| WO | WO 2018025010 | 2/2018 |

OTHER PUBLICATIONS

Li et al., "Well Treatment Fluids Prepared With Oilfield Produced Water: Part II", SPE-133379-MS, Sep. 2010, 7 pages.
McMahon et al., "First 100% Reuse of Bakken Produced Water in Hybrid Treatments Using Inexpensive Polysaccharide Gelling Agents", SPE-173783-MS, Apr. 2015, 9 pages.
International Search Report and Written Opinion of the International Searching Authority issued in International Application No. PCT/US2016/032637 dated Sep. 29, 2016; 12 pages.
Communication Pursuant to Article 94(3) EPC issued in EPO Communication No. 16725699.9 dated Jul. 4, 2019, 7 pages.
Gulf Cooperation Council Examination Report issued in GCC Application No. GC 2017-32719 dated Feb. 3, 2019, 4 pages.
International Search Report and Written Opinion of the International Searching Authority issued in International Application No. PCT/US2019/038709 dated Sep. 12, 2019, 16 pages.
EPO Communication Pursuant to Article 94(3) EPC in EPO Appln. No. 16725699.9, dated Mar. 25, 2020, 6 pages.

* cited by examiner

HYDRAULIC FRACTURING FLUID

TECHNICAL FIELD

This disclosure relates to high temperature salt water-based fracturing fluids enhanced with nanomaterials.

BACKGROUND

Fracturing fluid is often injected into subterranean reservoirs to hydraulically fracture the reservoir rock. Fracturing fluid is commonly formulated with fresh water. However, fresh water can be costly and difficult to obtain in some production areas. Use of seawater, produced water, brine, or the like with high levels of total dissolved solids (TDS) as a base fluid for hydraulic fracturing can be limited by the instability of the resulting fracturing fluids at elevated temperatures.

SUMMARY

In a first general aspect, a fracturing fluid includes a base fluid including salt water, a polymer, a crosslinker, and a nanomaterial.

Implementations of the first general aspect may include one or more of the following features.

The base fluid may include total dissolved solids of at least about 500 mg/L. The salt water may include seawater, produced water, brine, brackish water, or a combination thereof. In some cases, the seawater includes untreated seawater.

The crosslinker may include a Zr crosslinker, a Ti crosslinker, an Al crosslinker, a borate crosslinker, or a combination thereof. In some cases, the fracturing fluid includes from about 0.02% to about 2% by weight of the crosslinker.

The nanomaterial may include $ZrO_2$ nanoparticles, $TiO_2$ nanoparticles, $CeO_2$ nanoparticles; Zr nanoparticles, Ti nanoparticles, Ce nanoparticles, metal-organic polyhedra comprising Zr, Ti, Ce, or a combination thereof; carbon nanotubes, carbon nanorods, nano graphene, nano graphene oxide; or any combination thereof. In some cases, the nanomaterial is stabilized with a polymer, a surfactant, or a combination thereof. In one example, the nanomaterial is stabilized with polyvinylpyrrolidone. The fracturing fluid may include about 0.0002% to about 2% by weight of the nanomaterial.

The polymer may include guar, hydroxpropyl guar, carboxymethyl hydroxypropyl guar, or a combination thereof.

The fracturing fluid may include one or more additives, such as a bactericide, a buffer, a stabilizer, a viscosity breaker, a surfactant, a scale inhibitor, or a combination thereof. In one example, the buffer includes bicarbonate, carbonate, acetate, or a combination thereof. The stabilizer may include sodium thiosulfate, sorbitol, alkylated sorbitol, or a combination thereof. The viscosity breaker may include an oxidative breaker.

As described herein, the viscosity and viscosity lifetime of fracturing fluids with both crosslinkers and nanomaterials are greater than the sum of the effects of crosslinkers and nanomaterials taken separately. Moreover, this synergistic effect offers significant, practical advantages, including the ability to use salt water rather than fresh water for fracturing fluids, the ability to reduce polymer loading to achieve a desired viscosity, and the ability to achieve better formation cleanup after the fracturing treatment.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
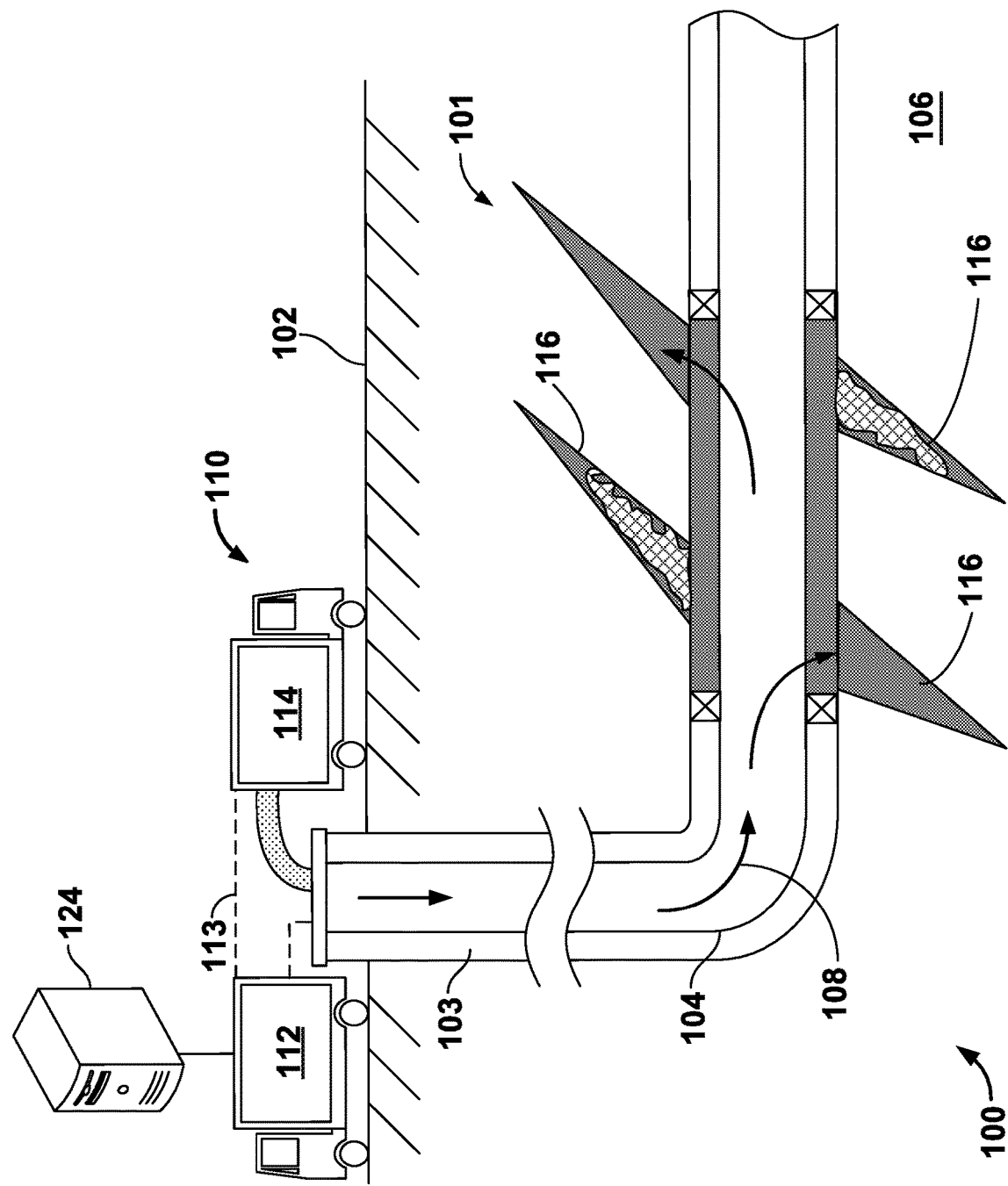
FIG. 1 depicts delivery of a fracturing fluid to a subterranean formation.

FIG. 1 depicts an example well system 100 for applying a fracture treatment to a subterranean formation 101. Fracture treatments can be used, for example, to form or propagate fractures in a rock layer by injecting pressurized fluid. The fracture treatment can include an acid treatment to enhance or otherwise influence production of petroleum, natural gas, coal seam gas, or other types of reservoir resources. The example well system 100 includes an injection system 110 that applies fracturing fluid 108 to a reservoir 106 in the subterranean zone 101. The subterranean zone 101 can include a formation, multiple formations or portions of a formation. The injection system 110 includes control trucks 112, pump trucks 114, a wellbore 103, a working string 104 and other equipment. In the example shown in FIG. 1, the pump trucks 114, the control trucks 112 and other related equipment are above the surface 102, and the wellbore 103, the working string 104, and other equipment are beneath the surface 102. An injection system can be configured as shown in FIG. 1 or in a different manner and it can include additional or different features as appropriate. The injection system 110 can be deployed in any suitable environment, for example, via skid equipment, a marine vessel, sub-sea deployed equipment, or other types of equipment.

The wellbore 103 shown in FIG. 1 includes vertical and horizontal sections. Generally, a wellbore can include horizontal, vertical, slant, curved, and other types of wellbore geometries and orientations, and the acid treatment can generally be applied to any portion of a subterranean zone 101. The wellbore 103 can include a casing that is cemented or otherwise secured to the wellbore wall. The wellbore 103 can be uncased or include uncased sections. Perforations can be formed in the casing to allow fracturing fluids and/or other materials to flow into the reservoir 106. Perforations can be formed using shape charges, a perforating gun, and/or other tools.

The pump trucks 114 can include mobile vehicles, immobile installations, skids, hoses, tubes, fluid tanks or reservoirs, pumps, valves, and/or other suitable structures and equipment. The pump trucks 114 can communicate with the control trucks 112, for example, by a communication link 113. The pump trucks 114 are coupled to the working string 104 to communicate the fracturing fluid 108 into the wellbore 103. The working string 104 can include coiled tubing, sectioned pipe, and/or other structures that communicate fluid through the wellbore 103. The working string 104 can include flow control devices, bypass valves, ports, and or other tools or well devices that control the flow of fracturing fluid from the interior of the working string 104 into the reservoir 106.

Fracturing fluid 108 includes a base fluid and one or more polymers, crosslinkers, and nanomaterials. Fracturing fluid 108 may also include one or more buffers, stabilizers, and viscosity breakers. In some cases, fracturing fluid 108 include one or more other additives.

Base fluid in fracturing fluid 108 includes salt water. As describe herein, "salt water" generally refers to water including dissolved salts such as sodium chloride, such as seawater (e.g., untreated seawater), produced water, brine, brackish water, and the like. The base fluid is typically high in total dissolved solids (TDS). TDS in the base fluid may be in a range from about 500 mg/L to over 300,000 mg/L. An acidic pH adjusting agent such as acetic acid or diluted hydrogen chloride (HCl) may be used to adjust the pH of the base fluid to a pH of less than about 7, more particularly, to a pH of less than about 6.

Polymers suitable for fracturing fluid 108 include polysaccharides such as hydroxypropyl guar (HPG), carboxymethylhydroxypropyl guar (CMHPG), guar, carboxymethyl guar (CMG), hydrophobically modified guars, guar-containing compounds, and artificially modified polymers, and other polymers generally known in the art to be suitable for fracturing fluids. The polymer may be in the form of a slurry. Slurries can be made by dispersions of dry polymer particles in solvent like mineral oil with a suspending aid such as modified clay. Fracturing fluid 108 typically includes about 5 pounds per thousand gallons of fracturing fluid (ppt) to about 100 ppt of one or more such polymers.

Crosslinkers suitable for fracturing fluid 108 include zirconium (Zr) crosslinkers, typically having a $ZrO_2$ content of about 4 wt % to about 14 wt % or more. Fracturing fluid 108 typically includes about 0.1 gallons per thousand gallons of fracturing fluid (gpt) to about 10 gpt of one or more such crosslinkers. Suitable zirconium crosslinkers include by non-limiting example, zirconium lactates (such as sodium zirconium lactate), triethanolamines, 2,2'-iminodiethanol, and with mixtures of these ligands. Crosslinkers suitable for fracturing fluid may also include titanium (Ti) crosslinkers. Suitable titanate crosslinkers include by non-limiting example, titanate crosslinkers with ligands such as lactates and triethanolamines, and mixtures, and optionally delayed with hydroxyacetic acid. Crosslinkers suitable for fracturing fluid may also include borate crosslinkers, aluminum (Al) crosslinkers, chromium (Cr) crosslinkers, iron (Fe) crosslinkers, hafnium (Hf) crosslinkers, and combinations thereof.

Buffers suitable for fracturing fluid 108 include bicarbonate (such as $NaHCO_3$), carbonate (such as $Na_2CO_3$), phosphate, hydroxide, acetate, formate, and combinations thereof.

Stabilizers suitable for fracturing fluid 108 include sodium thiosulfate ($Na_2S_2O_3$ or $Na_2S_2O_3 \cdot 5H_2O$), sorbitol and commercially available alkylated sorbitol.

Nanomaterials suitable for fracturing fluid 108 include $ZrO_2$, $TiO_2$, and $CeO_2$ nanoparticles; polyvinylpyrrolidone (PVP)-stabilized $ZrO_2$, $TiO_2$, and $CeO_2$ nanoparticles, carbon nanomaterials (carbon nanorods, carbon nanotubes, carbon nanodots, nano graphene, nano graphene oxide, and the like); Zr, Ti, and Ce nanoparticles and other metal nanoparticles; metal-organic polyhedra including Zr, Ti, or Ce, and other metals. As used herein, "metal-organic polyhedra" refer to a hybrid class of solid-state crystalline materials constructed from the in-situ assembly of highly modular pre-designed molecular building blocks (MBBs) into discrete architectures (0-D) containing a cluster of multi-valent metal nodes. Suitable nanomaterials may have a dimension in a range between about 0.1 nm and about 1000 nm. The nanomaterials may be added as solutions in which the nanoparticles are suspended and stabilized with surfactants and/or polymers like polyvinylpyrrolidone. Fracturing fluid 108 typically includes about 0.0002% to 2% by weight of fluid of one or more such nanomaterials. In some cases, the nanomaterials and the crosslinkers include a common metal (e.g., Zr or Ti).

Viscosity breakers suitable for fracturing fluid 108 include oxidative breakers such as persulfate (e.g., sodium persulfate), bromate (e.g., sodium bromate). Fracturing fluid 108 typically includes one or more such viscosity breakers and related encapsulated breakers.

Additives suitable for fracturing fluid 108 also include surfactants, scale inhibitors, clay stabilizers, and the like, depending on the specific requirements of oilfield operations. A surfactant present in fracturing fluid 108 acts as a surface active agent and may function as an emulsifier, dispersant, oil-wetter, water-wetter, foamer, and defoamer. Suitable examples of surfactants include, but are not limited to fatty alcohols, cetyl alcohol, stearyl alcohol, and cetostearyl alcohol. Fracturing fluid 108 may incorporate a surfactant or blend of surfactants in an amount between about 0.01 wt % and about 5 wt % of total fluid weight.

While the fracturing fluid of the present disclosure is described herein as including the above-mentioned components, it should be understood that the fluid of the present disclosure may optionally include other chemically different materials. In embodiments, the fluid may further comprise different stabilizing agents, surfactants, diverting agents, proppant, clay stabilizers, gel stabilizers, bactericides, or other additives.

The combined presence of crosslinkers and nanomaterials in fracturing fluid 108 enhances the fluid viscosity of the fracturing fluid at temperatures of about 270° F. to about 300° F. and above, with the fracturing fluid demonstrating a higher viscosity and a longer lifetime than would be expected based on the properties of fracturing fluids with crosslinkers or nanomaterials only. That is, the viscosity and viscosity lifetime of fracturing fluid 108 with both crosslinkers and nanomaterials are greater than the sum of the effects of crosslinkers and nanomaterials taken separately. Moreover, this synergistic effect offers significant, practical advantages, including the ability to use salt water rather than fresh water for fracturing fluids, the ability to reduce polymer loading to achieve a desired viscosity, and the ability to achieve better formation cleanup after the fracturing treatment.

The control trucks 112 can include mobile vehicles, immobile installations, and/or other suitable structures. The control trucks 112 can control and/or monitor the injection treatment. For example, the control trucks 112 can include communication links that allow the control trucks 112 to communicate with tools, sensors, and/or other devices installed in the wellbore 103. The control trucks 112 can receive data from, or otherwise communicate with, a computing system 124 that monitors one or more aspects of the acid treatment.

In addition, the control trucks 112 can include communication links that allow the control trucks 112 to communicate with the pump trucks 114 and/or other systems. The control trucks 112 can include an injection control system that controls the flow of the fracturing fluid 108 into the reservoir 106. For example, the control trucks 112 can monitor and/or control the concentration, density, volume, flow rate, flow pressure, location, proppant, and/or other properties of the fracturing fluid 108 injected into the reservoir 106. The reservoir 106 can include a fracture network with multiple fractures 116, as shown in FIG. 1

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

EXAMPLES

The following examples are put forth so as to provide those of ordinary skill in the art with a complete disclosure and description of how the compositions disclosed herein are made and evaluated, and are intended to be purely exemplary and are not intended to be limiting in scope. Efforts have been made to ensure accuracy with respect to numbers (e.g., amounts, temperature, etc.), but some errors and deviations should be accounted for.

Examples 1-6 provide exemplary fracturing fluids prepared in untreated seawater and including a crosslinker and metal oxide nanoparticles. Comparative examples include fracturing fluids prepared in untreated seawater with a crosslinker or metal oxide nanoparticles, but not both. Fracturing fluids were prepared using a blender (e.g., a WARING blender). The polymer was hydrated in the seawater first to form a base fluid. Additives (e.g., buffer and stabilizer) were added to the base fluid followed by the addition of nanomaterial and the crosslinker. FIGS. 2-7 show plots of viscosity (cP) at 40/s shear rate over time for the fracturing fluids at the temperature shown by plots 200, 300, 400, 500, 600, and 700, respectively. Viscosity of the fracturing fluids was measured at a shear rate of 40 $sec^{-1}$ at selected temperatures with a Fann 50-type High-Pressure, High-Temperature (HPHT) viscometer (e.g., a Grace M5600 HPHT Rheometer).

Untreated Saudi seawater (TDS of about 57,000 mg/L) was used to prepare the fracturing fluids in Examples 1-6. The $ZrO_2$ nanoparticle solution (20 wt %, 45-55 nm), $TiO_2$ nanoparticle solution (rutile, 15 wt %, 5-15 nm), and $CeO_2$ nanoparticle solution (20 wt %, 30-50 nm) were commercially available products, and used as received without further treatment. The Zr crosslinkers, the HPG slurry, and the sorbitol derivative are all commercially available.

Example 1

Figure 2:
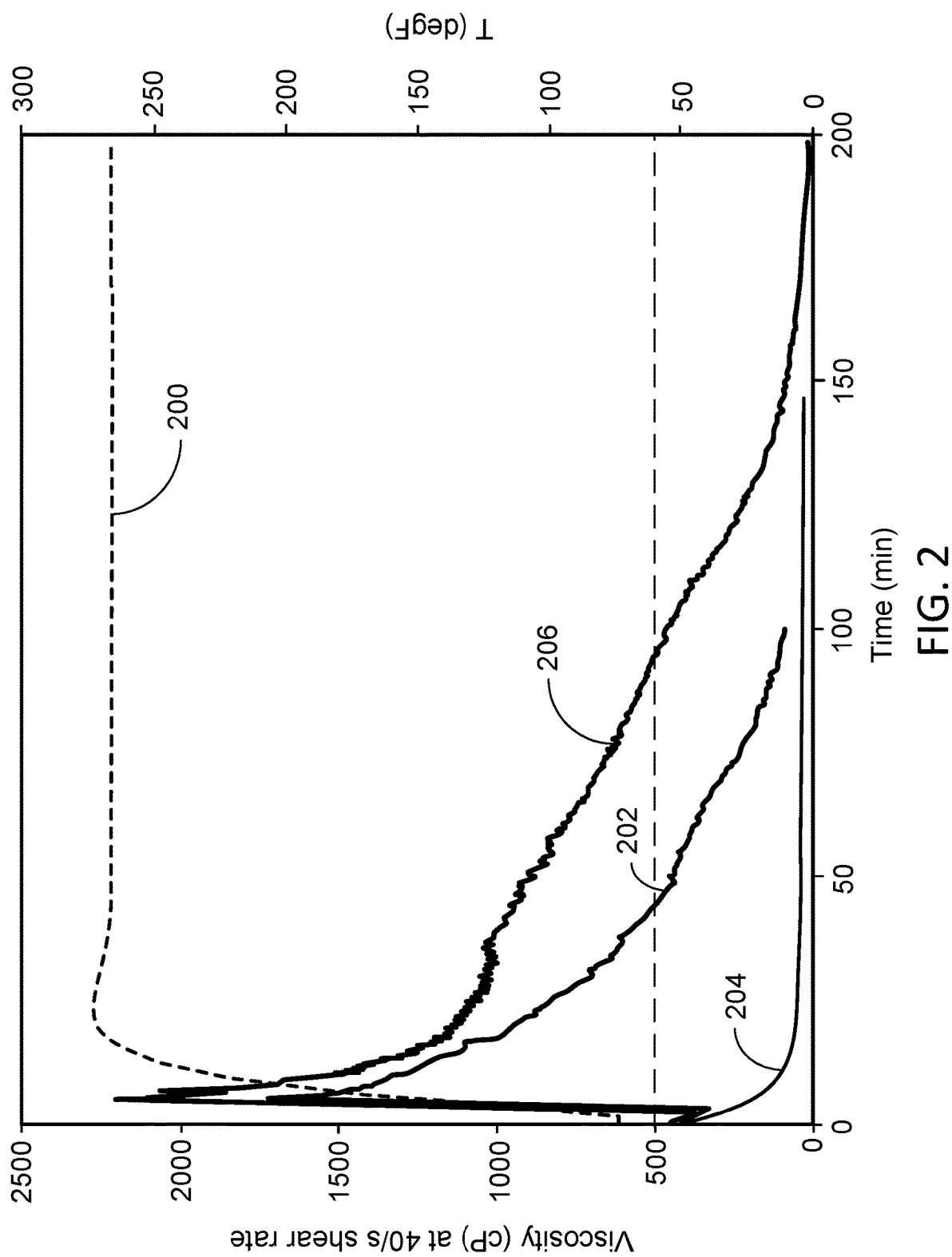
FIG. 2 shows plots of viscosity vs. time for the fracturing fluids of Example 1.

Comparative Fracturing Fluids 1A and 1B (CFF1A and CFF1B, respectively) and Fracturing Fluid 1 (FF1) were prepared as shown in Table 1. CFF1A was prepared with seawater (TDS of about 57,000 mg/L), 60 ppt HPG slurry (i.e., containing 60 ppt of dried HPG), 2 ppt $NaHCO_3$, 10 ppt $Na_2S_2O_3 \cdot 5\ H_2O$, 10 ppt sorbitol, and crosslinked with 5 gpt of the Zr crosslinker (type 1). Plot 200 in FIG. 2 shows the temperature (° F.) at which viscosity measurements were made. Plot 202 shows the viscosity of CFF1A at 270° F. The fluid viscosity stayed above 500 cP for about 44 minutes. CFF1B was prepared with seawater, 60 ppt HPG slurry, 2 ppt NaHCO$_3$, 10 ppt Na$_2$S$_2$O$_3$. 5 H$_2$O, 10 ppt sorbitol, and 1 gpt of the ZrO$_2$ nanoparticle solution. No Zr crosslinker was present in CFF1B. As shown in plot 204, the viscosity of CFF1B at 270° F. decreased rapidly and never reached 500 cP. FF1 was prepared with seawater, 60 ppt HPG slurry, 2 ppt NaHCO$_3$, 10 ppt Na$_2$S$_2$O$_3$. 5 H$_2$O, 10 ppt sorbitol, 1 gpt of the ZrO$_2$ nanoparticle solution, and 5 gpt of the Zr crosslinker (type 1). As shown in plot 206, the viscosity of FF1 at 270° F. stayed above 500 cP for about 95 minutes. FF1 demonstrated a longer lifetime (e.g., length of time with a viscosity above 500 cP), and the viscosity of FF1 was higher than that of CFF1A and CFF1B combined at elapsed times exceeding about 20 minutes, indicating that the Zr crosslinker and the ZrO$_2$ nanoparticles in FF1 worked synergically to enhance the fluid viscosity of FF1.

TABLE 1

Example 1: Fracturing fluid with Zr crosslinker and ZrO$_2$ nanoparticles.

| Component | CFF1A | CFF1B | FF1 |
|---|---|---|---|
| Seawater (TDS 57,000 mg/L) | | | |
| HPG slurry (ppt) | 60 | 60 | 60 |
| NaHCO$_3$ (ppt) | 2 | 2 | 2 |
| Na$_2$S$_2$O$_3$•5H$_2$O (ppt) | 10 | 10 | 10 |
| Sorbitol (ppt) | 10 | 10 | 10 |
| Zr crosslinker (gpt) | 5 | | 5 |
| ZrO$_2$ nanoparticle solution (gpt) | | 1 | 1 |

Example 2

Figure 3:
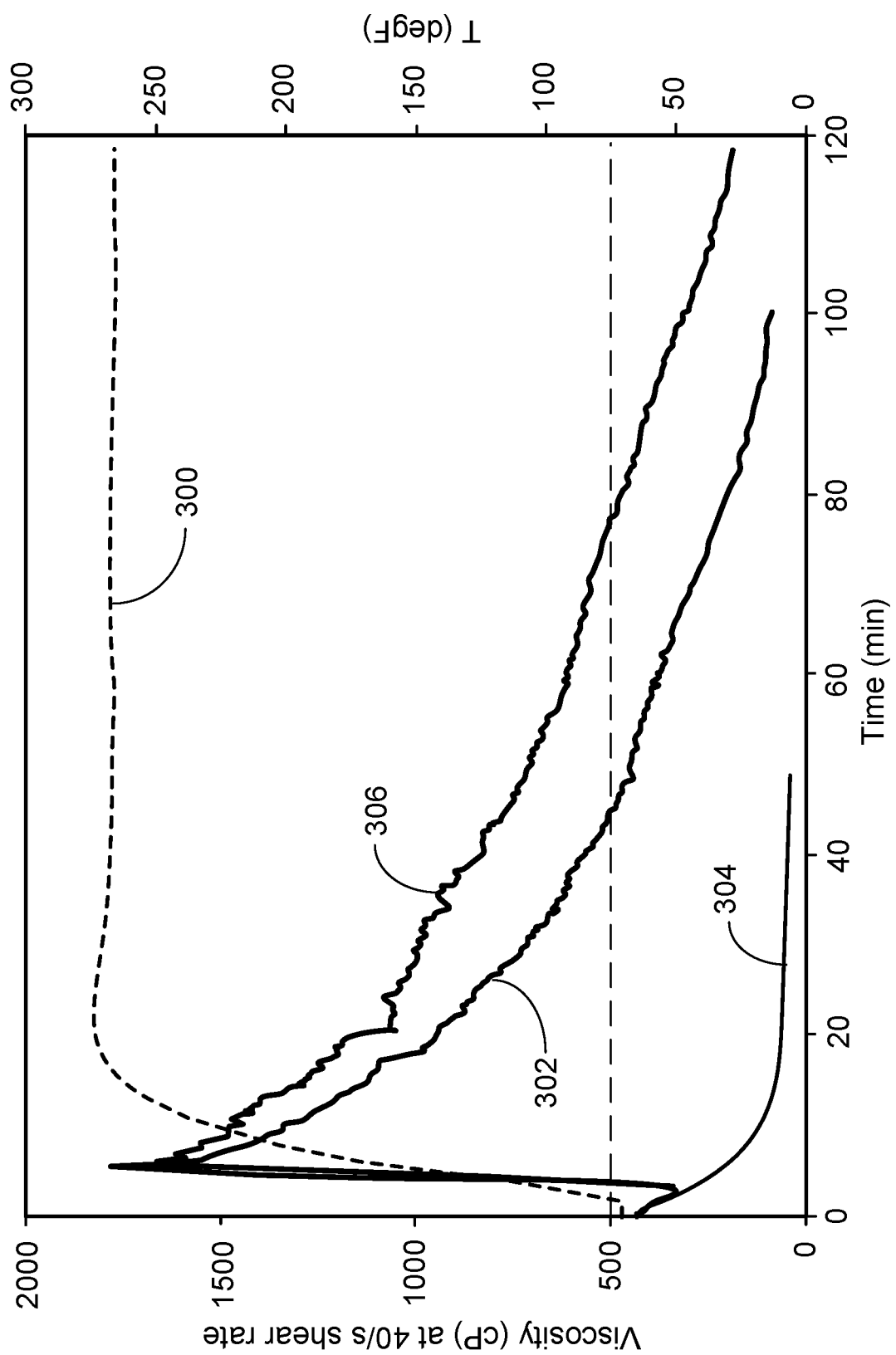
FIG. 3 shows plots of viscosity vs. time for the fracturing fluids of Example 2.

Comparative Fracturing Fluids 2A and 2B (CFF2A and CFF2B, respectively) and Fracturing Fluid 2 (FF2) were prepared as shown in Table 2. CFF2A was prepared with seawater (TDS of about 57,000 mg/L), 60 ppt HPG slurry, 2 ppt NaHCO$_3$, 10 ppt Na$_2$S$_2$O$_3$. 5 H$_2$O, 10 ppt sorbitol, and crosslinked with 5 gpt of Zr crosslinker (type 1). Plot 300 in FIG. 3 shows the temperature (° F.) at which viscosity measurements were made. As shown in plot 302, the fluid viscosity of CFF2A stayed above 500 cP for about 44 minutes. CFF2B was prepared with seawater, 60 ppt HPG slurry, 2 ppt NaHCO$_3$, 10 ppt Na$_2$S$_2$O$_3$. 5 H$_2$O, 10 ppt sorbitol, and 1 gpt of the TiO$_2$ nanoparticle solution. No Zr crosslinker was present in CFF2B. As shown in plot 304, the viscosity of CFF2B at 270° F. decreased rapidly and never reached 500 cP. FF2 was prepared with seawater, 60 ppt HPG slurry, 2 ppt NaHCO$_3$, 10 ppt Na$_2$S$_2$O$_3$. 5 H$_2$O, 10 ppt sorbitol, 1 gpt of the TiO$_2$ nanoparticle solution, and 5 gpt of the Zr crosslinker (type 1). As shown in plot 306, the viscosity of FF2 at 270° F. stayed above 500 cP for about 78 minutes. FF2 demonstrated a longer lifetime (e.g., length of time with a viscosity above 500 cP), and the viscosity of FF2 was higher than that of CFF2A and CFF2B combined at elapsed times exceeding about 20 minutes, indicating that the Zr crosslinker and the nano TiO$_2$ in FF2 worked synergically to enhance the fluid viscosity of FF2.

TABLE 2

Example 2: Fracturing fluid with Zr crosslinker and TiO$_2$ nanoparticles.

| Component | CFF2A | CFF2B | FF2 |
|---|---|---|---|
| Seawater (TDS 57,000 mg/L) | | | |
| HPG slurry (ppt) | 60 | 60 | 60 |
| NaHCO$_3$ (ppt) | 2 | 2 | 2 |
| Na$_2$S$_2$O$_3$•5H$_2$O (ppt) | 10 | 10 | 10 |
| Sorbitol (ppt) | 10 | 10 | 10 |
| Zr crosslinker (gpt) | 5 | | 5 |
| TiO$_2$ nanoparticle solution (gpt) | | 1 | 1 |

Example 3

Figure 4:
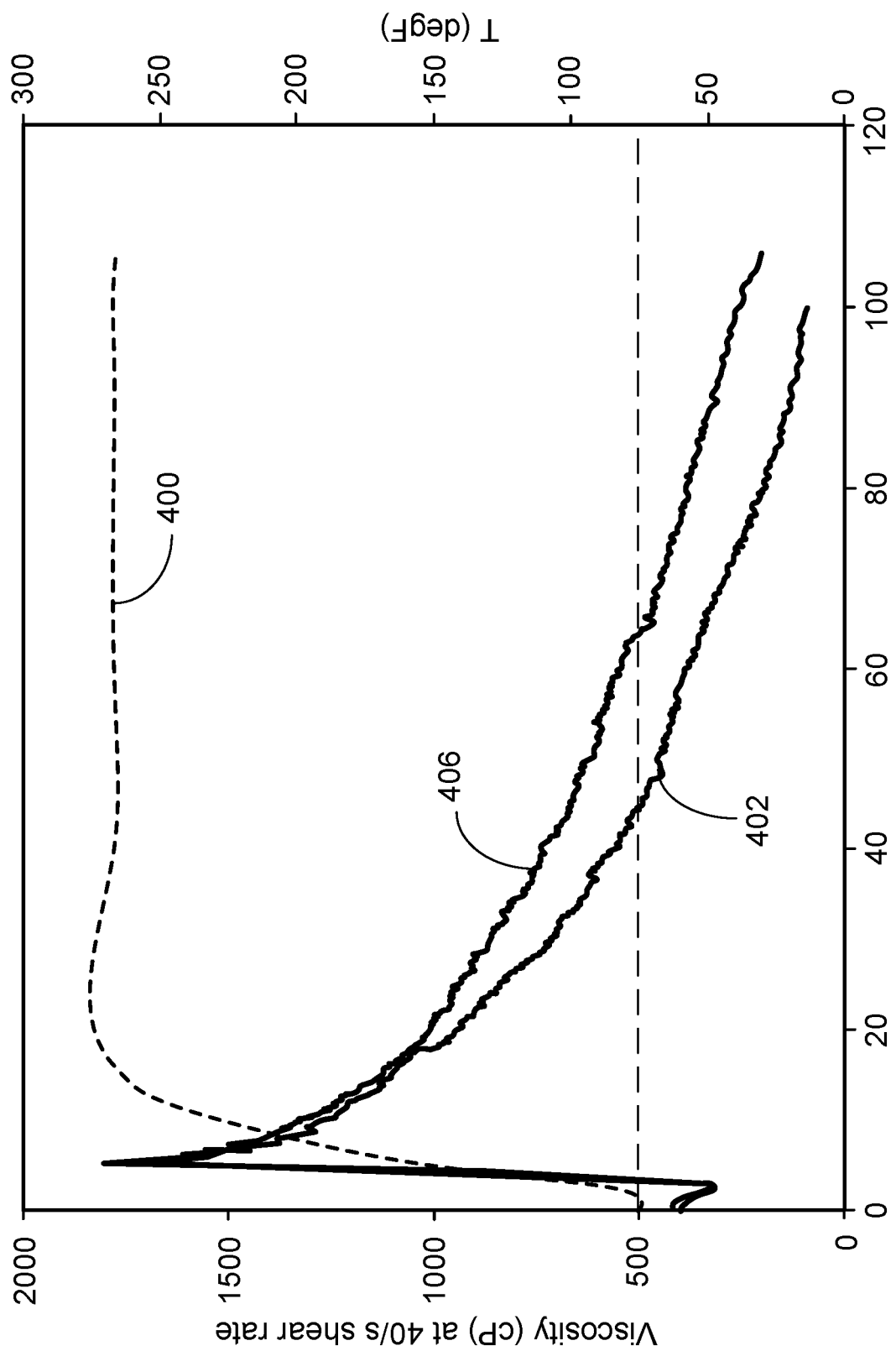
FIG. 4 shows plots of viscosity vs. time for the fracturing fluids of Example 3.

Comparative Fracturing Fluids 3A and 3B (CFF3A and CFF3B, respectively) and Fracturing Fluid 3 (FF3) were prepared as shown in Table 3. CFF3A was prepared with seawater, 60 ppt HPG slurry, 2 ppt NaHCO$_3$, 10 ppt Na$_2$S$_2$O$_3$. 5 H$_2$O, 10 ppt sorbitol, and crosslinked with 5 gpt of the Zr crosslinker (type 1). Plot 400 in FIG. 4 shows the temperature (° F.) at which viscosity measurements were made. As shown in plot 402, the fluid viscosity of CFF3A stayed above 500 cP for about 44 minutes. FF3 was prepared with seawater, 60 ppt HPG slurry, 2 ppt NaHCO$_3$, 10 ppt Na$_2$S$_2$O$_3$. 5 H$_2$O, 10 ppt sorbitol, 1 gpt of the CeO$_2$ nanoparticle solution, and 5 gpt of the Zr crosslinker (type 1). As shown in plot 406, the viscosity of FF3 at 270° F. stayed above 500 cP for about 64 minutes. FF3 demonstrated a longer lifetime (e.g., length of time with a viscosity above 500 cP) than CFF3A, and the viscosity of FF3 was higher than that of CFF3A at elapsed times exceeding about 20 minutes. CFF3B was prepared with seawater, 60 ppt HPG slurry, 2 ppt NaHCO$_3$, 10 ppt Na$_2$S$_2$O$_3$.5H$_2$O, and 10 ppt sorbitol; 1 gpt of the CeO$_2$ nanoparticle solution was then added. The Zr crosslinker was not used. The viscosity of the fluid (not shown) at 270° F. quickly dropped below 500 cP within minutes. This suggests that the Zr crosslinker and the CeO$_2$ nanoparticles worked synergically to enhance the fluid viscosity.

TABLE 3

Example 3: Fracturing fluid with Zr crosslinker and CeO$_2$ nanoparticles.

| Component | CFF3A | CFF3B | FF3 |
|---|---|---|---|
| Seawater (TDS 57,000 mg/L) | | | |
| HPG slurry (ppt) | 60 | 60 | 60 |
| NaHCO$_3$ (ppt) | 2 | 2 | 2 |
| Na$_2$S$_2$O$_3$•5H$_2$O (ppt) | 10 | 10 | 10 |
| Sorbitol (ppt) | 10 | 10 | 10 |
| Zr crosslinker (gpt) | 5 | | 5 |
| CeO$_2$ nanoparticle solution (gpt) | | 1 | 1 |

Example 4

Figure 5:
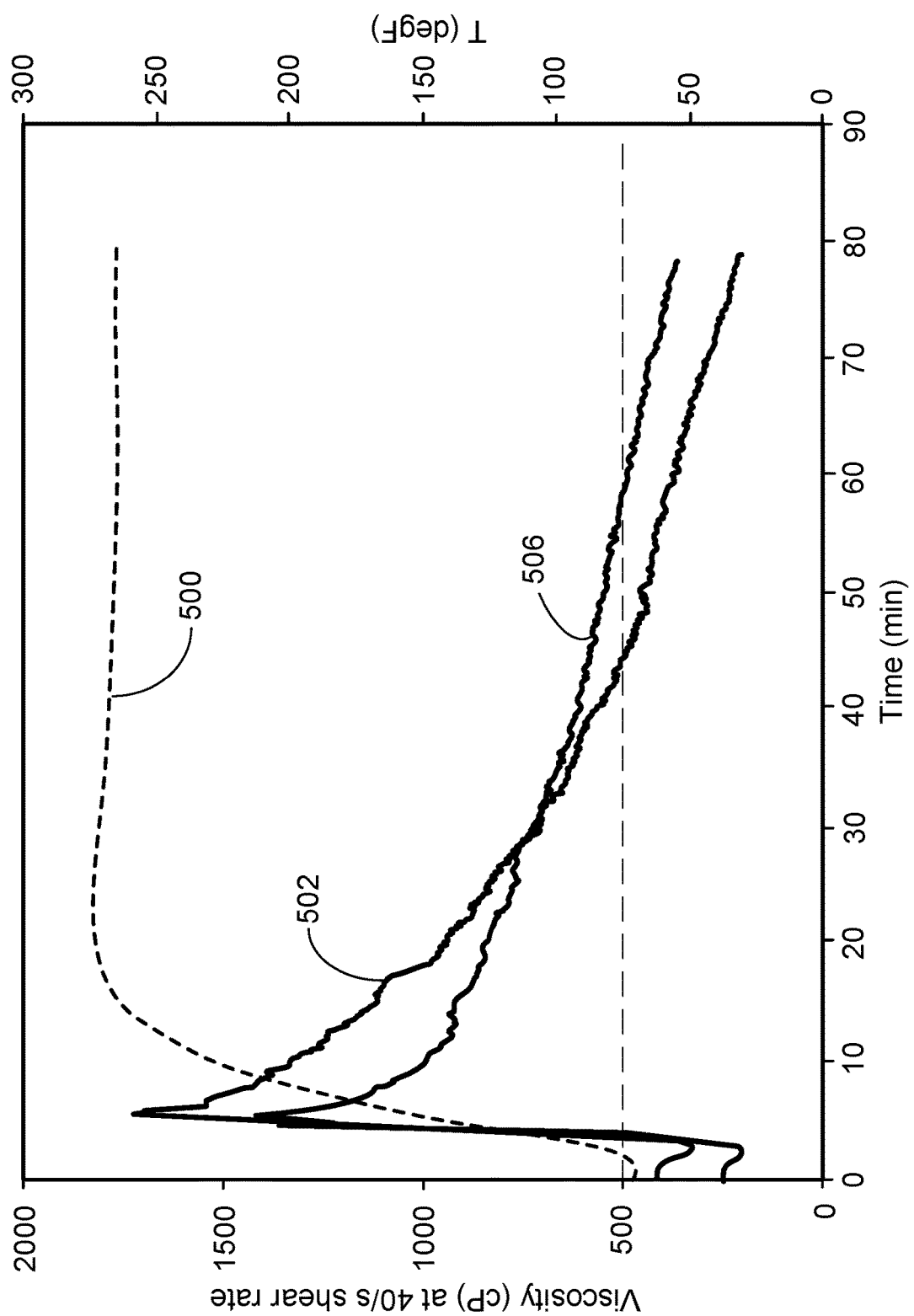
FIG. 5 shows plots of viscosity vs. time for the fracturing fluids of Example 4.

Comparative Fracturing Fluid 4A (CFF4A) and Fracturing Fluid 4 (FF4) were prepared as shown in Table 4. CFF4A was prepared with seawater, 60 ppt HPG slurry, 2 ppt NaHCO$_3$, 10 ppt Na$_2$S$_2$O$_3$.5H$_2$O, 10 ppt sorbitol, and crosslinked with 5 gpt of the Zr crosslinker (type 1). Plot 500 in FIG. 5 shows the temperature (° F.) at which viscosity measurements were made. As shown in plot 502, the fluid viscosity of CFF4A stayed above 500 cP for about 44 minutes. FF4 was prepared with seawater, 50 ppt HPG slurry, 2 ppt NaHCO$_3$, 10 ppt Na$_2$S$_2$O$_3$.5H$_2$O, 10 ppt sorbitol, 1 gpt of the ZrO$_2$ nanoparticle solution, and 5 gpt of the Zr crosslinker (type 1). As shown in plot 506, the viscosity of FF4 at 270° F. stayed above 500 cP for about 59 minutes. Even with 50 ppt of the polymer loading, FF4 showed a longer lifetime than CFF4A with 60 ppt of the polymer. Thus, the addition of 1 gpt of the ZrO$_2$ nanoparticle solution appears to compensate for a lower polymer content without sacrificing the fluid performance at high temperatures. Reduced polymer loading usually translates into better formation cleanup after the fracturing treatment.

TABLE 4

Example 4: Fracturing fluid with Zr crosslinker and ZrO$_2$ nanoparticles.

| Component | CFF4A | FF4 |
|---|---|---|
| Seawater (TDS 57,000 mg/L) | | |
| HPG slurry (ppt) | 60 | 50 |
| NaHCO$_3$ (ppt) | 2 | 2 |
| Na$_2$S$_2$O$_3$•5H$_2$O (ppt) | 10 | 10 |
| Sorbitol (ppt) | 10 | 10 |
| Zr crosslinker (ppt) | 5 | 5 |
| ZrO$_2$ nanoparticle solution (gpt) | | 1 |

Example 5

Figure 6:
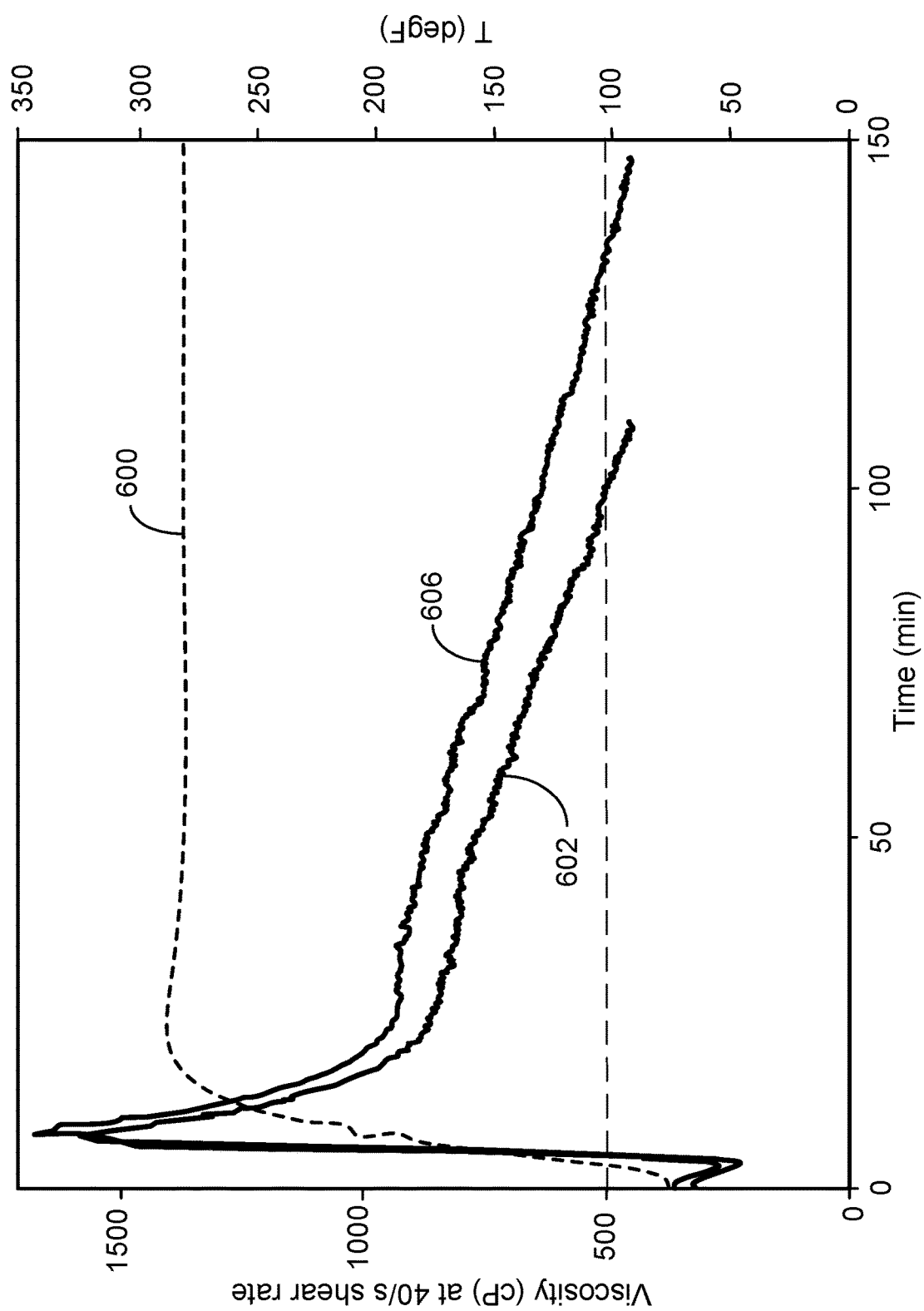
FIG. 6 shows plots of viscosity vs. time for the fracturing fluids of Example 5.

Comparative Fracturing Fluids 5A and 5B (CFF5A and CFF5B, respectively) and Fracturing Fluid 5 (FF5) were prepared as shown in Table 5. CFF5A was prepared with seawater, 54 ppt HPG slurry, 2 ppt NaHCO$_3$, 10 ppt Na$_2$S$_2$O$_3$.5H$_2$O, 5 gpt of commercially available alkylated sorbitol, and crosslinked with 2.8 gpt of Zr crosslinker (type 2, pH adjusted to about 6.0). No nano solution was added to CFF5A. Plot 600 in FIG. 6 shows the temperature (° F.) at which viscosity measurements were made. As shown in plot 602, the fluid viscosity of CFF5A at 285° F. stayed above 500 cP for about 100 minutes. FF5 was prepared with seawater, 54 ppt HPG slurry, 2 ppt NaHCO$_3$, 10 ppt Na$_2$S$_2$O$_3$.5H$_2$O, 5 gpt of the alkylated sorbitol, 0.5 gpt of the ZrO$_2$ nanoparticle solution, and 2.8 gpt of the Zr crosslinker (Type 2, pH adjusted to about 6.0). As shown in plot 606, the viscosity of FF5 at 285° F. stayed above 500 cP for about 134 minutes. With the same polymer loading, FF5 showed longer lifetime than CFF5A due to the addition of 0.5 gpt of the nano ZrO$_2$ solution. CFF5B was prepared with seawater, 54 ppt HPG slurry, 2 ppt NaHCO$_3$, 10 ppt Na$_2$S$_2$O$_3$.5H$_2$O, and 5 gpt the alkylated sorbitol; 0.5 gpt of the ZrO$_2$ nanoparticle solution was then added. The Zr crosslinker was not used. The viscosity of the fluid (not shown) at 285° F. quickly dropped below 500 cP within minutes. This again suggests that the Zr crosslinker and the nano ZrO$_2$ worked synergically to enhance the fluid viscosity.

TABLE 5

Example 5: Fracturing fluid with Zr crosslinker and ZrO$_2$ nanoparticles.

| Component | CFF5A | CFF5B | FF5 |
|---|---|---|---|
| Seawater (TDS 57,000 mg/L) | | | |
| HPG slurry (ppt) | 54 | 54 | 54 |
| NaHCO$_3$ (ppt) | 2 | 2 | 2 |
| Na$_2$S$_2$O$_3$•5H$_2$O (ppt) | 10 | 10 | 10 |
| alkylated sorbitol (gpt) | 5 | 5 | 5 |
| Zr crosslinker, type 2 (gpt) | 2.8 | | 2.8 |
| ZrO$_2$ nanoparticle solution (gpt) | | 0.5 | 0.5 |

Example 6

Figure 7:
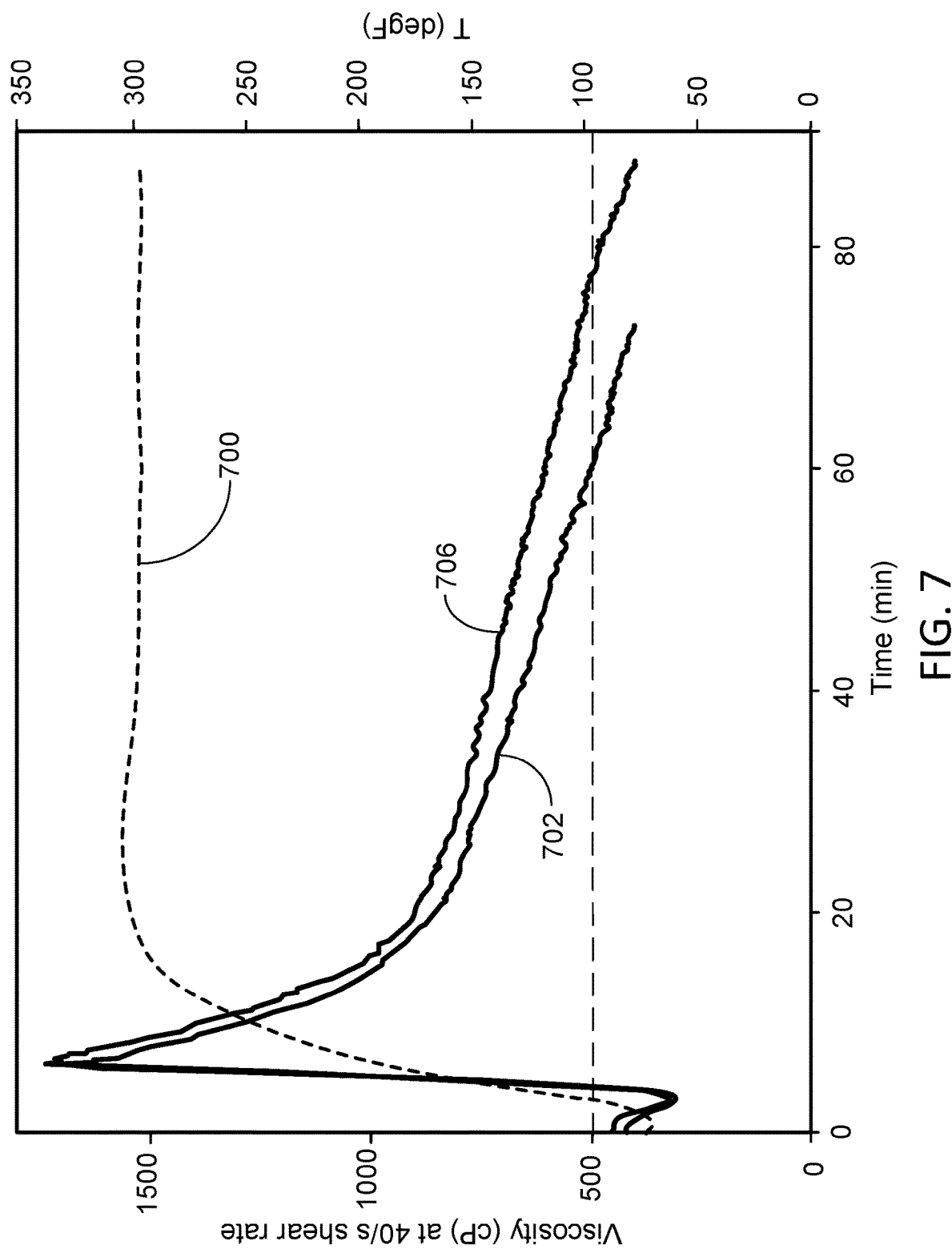
FIG. 7 shows plots of viscosity vs. time for the fracturing fluids of Example 6.

Comparative Fracturing Fluids 6A and 6B (CFF6A and CFF6B, respectively) and Fracturing Fluid 6 (FF6) were prepared as shown in Table 6. CFF6A was prepared with seawater, 60 ppt HPG slurry, 4 ppt NaHCO$_3$, 10 ppt Na$_2$S$_2$O$_3$.5H$_2$O, 5 gpt commercially available alkylated sorbitol, and crosslinked with 2.8 gpt of the Zr crosslinker (Type 2, pH adjusted to about 6.0). No nanoparticle solution was added to CFF6A. Plot 700 in FIG. 7 shows the temperature (° F.) at which viscosity measurements were made. As shown in plot 702, the fluid viscosity of CFF6A at 300° F. stayed above 500 cP for about 60 minutes. FF6 was prepared with seawater, 60 ppt HPG slurry, 4 ppt NaHCO$_3$, 10 ppt Na$_2$S$_2$O$_3$.5H$_2$O, 5 gpt of the alkylated sorbitol, 1 gpt of the ZrO$_2$ nanoparticle solution, and 2.8 gpt of the Zr crosslinker (Type 2, pH adjusted to about 6.0). As shown in plot 706, the viscosity of FF6 at 300° F. stayed above 500 cP for about 78 minutes. With the same polymer loading, FF6 showed a longer lifetime than CFF6A due to the addition of 1 gpt of the ZrO$_2$ nanoparticle solution. CFF6B was prepared with seawater, 60 ppt HPG slurry, 4 ppt NaHCO$_3$, 10 ppt Na$_2$S$_2$O$_3$.5H$_2$O, and 5 gpt of the alkylated sorbitol; 1 gpt of the ZrO$_2$ nanoparticle solution was then added. The Zr crosslinker was not used. The viscosity of the fluid (not shown) at 300° F. quickly dropped below 500 cP within minutes. This again suggests that the Zr crosslinker and the ZrO$_2$ nanoparticles worked synergically to enhance the fluid viscosity.

TABLE 6

Example 6: Fracturing fluid with Zr crosslinker and ZrO$_2$ nanoparticles.

| Component | CFF6A | CFF6B | FF6 |
|---|---|---|---|
| Seawater (TDS 57,000 mg/L) | | | |
| HPG slurry (ppt) | 60 | 60 | 60 |
| NaHCO$_3$ (ppt) | 4 | 4 | 4 |
| Na$_2$S$_2$O$_3$•5H$_2$O (ppt) | 10 | 10 | 10 |
| alkylated sorbitol (gpt) | 5 | 5 | 5 |
| Zr crosslinker, type 2 (gpt) | 2.8 | | 2.8 |
| Nano TiO$_2$ solution (gpt) | | 1 | 1 |

By way of summary, Table 7 shows the length of time the various fracturing fluids and comparative fracturing fluids (FFX, CFFXA, and CFFXB, where X corresponds to Example X) in Examples 1-6 maintained a viscosity above 500 cP at the elevated temperature disclosed with respect to each example. As discussed above with respect to Examples 1-6, these results demonstrate that presence of the nanoparticles has a greater than additive effect on the viscosity of the fracturing fluid at elevated temperatures. This synergistic effect is significant in that available water sources with high levels of total dissolved solids can be used to prepare fracturing fluids having a viscosity sufficient for use at elevated temperatures of at least 270° F. (e.g., 270° F. to 300° F.). In addition, the synergistic effect allows for longer lifetimes for equivalent polymer loading, as well as longer lifetimes for lower polymer loadings.

TABLE 7

Length of time (min) viscosity exceeds 500 cP at elevated temperature.

| Example X | CFFXA | CFFXB | FFX |
|---|---|---|---|
| Example 1 | 44 | 0 | 95 |
| Example 2 | 44 | 0 | 78 |
| Example 3 | 44 | 0 | 64 |
| Example 4 | 44 |  | 59 |
| Example 5 | 100 |  | 134 |
| Example 6 | 60 |  | 78 |

A number of implementations have been described. Nevertheless, it will be understood that various modifications can be made without departing from the spirit and scope of the disclosure.

What is claimed is:

1. A fracturing fluid comprising:
a base fluid comprising salt water;
a polymer;
a crosslinker; and
about 0.0002% to about 2% by weight of a nanomaterial comprising $ZrO_2$ nanoparticles, $TiO_2$ nanoparticles, or $CeO_2$ nanoparticles, or any combinations thereof, wherein at a temperature of greater than about 250° C., the viscosity of the fracturing fluid remains above about 500 cP at 40 s$^{-1}$ for a time period of greater than about 30% longer than without the nanomaterial present.

2. The fracturing fluid of claim 1, wherein the base fluid comprises total dissolved solids of at least about 500 mg/L.

3. The fracturing fluid of claim 1, wherein the salt water comprises seawater, produced water, brine, brackish water, or a combination thereof.

4. The fracturing fluid of claim 3, wherein the seawater comprises untreated seawater.

5. The fracturing fluid of claim 1, wherein the crosslinker comprises a Zr crosslinker, a Ti crosslinker, an Al crosslinker, a borate crosslinker, or a combination thereof.

6. The fracturing fluid of claim 1, wherein the fracturing fluid comprises from about 0.02% to about 2% by weight of the crosslinker.

7. The fracturing fluid of claim 1, wherein the nanomaterial is stabilized with a polymer, a surfactant, or a combination thereof.

8. The fracturing fluid of claim 7, wherein the nanomaterial is stabilized with polyvinylpyrrolidone.

9. The fracturing fluid of claim 1, wherein the polymer comprises guar, hydroxypropyl guar, carboxymethyl hydroxypropyl guar, or a combination thereof.

10. The fracturing fluid of claim 1, further comprising a bactericide.

11. The fracturing fluid of claim 1, further comprising a buffer, wherein the buffer comprises bicarbonate, carbonate, acetate, or a combination thereof.

12. The fracturing fluid of claim 1, further comprising a stabilizer, wherein the stabilizer comprises sodium thiosulfate, sorbitol, alkylated sorbitol, or a combination thereof.

13. The fracturing fluid of claim 1, further comprising a viscosity breaker, wherein the viscosity breaker comprises an oxidative breaker.

14. The fracturing fluid of claim 1, further comprising a surfactant.

15. The fracturing fluid of claim 1, further comprising a scale inhibitor.

* * * * *